Martin T. Olliff Jr INVENTORS
Julius E. Lloyd
Charles F. Williams
John K. Edmondson
William B. Brooks BY *[signature]* ATTORNEY Martin T. Olliff Jr INVENTORS
Julius E. Lloyd
Charles F. Williams
John K. Edmondson
William B. Brooks BY *Robt Williams* ATTORNEY

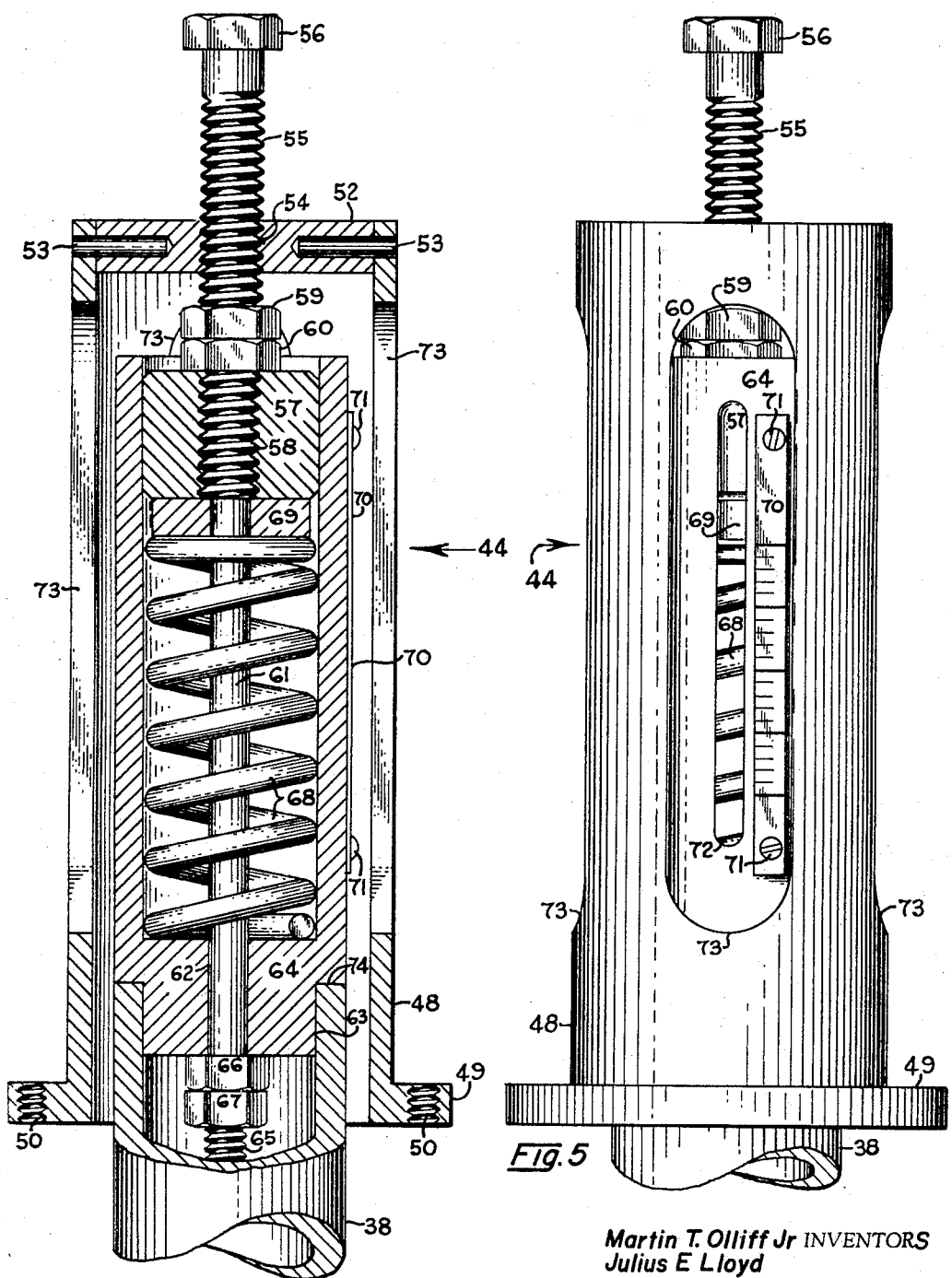

United States Patent Office 3,436,295
Patented Apr. 1, 1969

3,436,295
DISPLACEMENT APPARATUS FOR INSTALLING RIGID OR SEMI-RIGID INSULATION IN THE HEAD END OF A ROCKET MOTOR CASE
Martin T. Olliff, Jr., Julius E. Lloyd, Charles F. Williams, and John B. Edmondson, Huntsville, and William B. Brooks, Guntersville, Ala., assignors to Thiokol Chemical Corporation, Bristol, Pa., a corporation of Delaware
Filed Dec. 8, 1965, Ser. No. 512,371
Int. Cl. B29d 3/02
U.S. Cl. 156—423                    6 Claims

ABSTRACT OF THE DISCLOSURE

An apparatus for installing insulation in the head end of a rocket motor case including a support for retaining the rocket motor case in a vertical position, an assembly for feeding an adhesive into the head end, forcing the insulation into contact with the adhesive and aligning the insulation in proper position in the head end.

This invention relates to improvements in an apparatus for bonding two adherends together with a curable adhesive, in which the adhesive when cured to its optimum physical properties contains no void spaces, thus providing a continuous solid or semisolid mass between the two adherends and comprises the basic principle of submerging one of the adherends to be bonded into an excess amount of adhesive sealing the adhesive between the two adherends, removing the excess adhesive, and then curing the entrapped adhesive.

In carrying out the instant invention, it is contemplated that the first adherent is to be a rocket motor case. The case as is conventional contains a domed section in the forward end which is symmetrical about the longitudinal axis of the case. The domed section generally contains an opening in the forwardmost position thereof and the opening is concentric about the longitudinal centerline of the case. The opening also provides a reference point for mechanical attachments and the location of the second adherend.

It is also intended that the second adherend comprise a segment or segments of insulation that is to be installed in the domed section of the case. The second adherend is solid in physical form, being rigid or semirigid in strucure and will conform in shape to the domed section of the case. The second adherend that is to be bonded by an adhesive to the domed section is symmetrical about the longitudinal center line of the case with an opening in the center thereof which is aligned with the opening in the domed section so that the opening in the second adherend is concentric about the center line of the case. The diameter of the opening in the second adherend being slightly less than the diameter of the opening in the domed section, thus providing a means of mechanical attachments for holding the second adherend mechanically during the operation of installing the second adherend.

A curable liquid or semi-liquid adhesive of rheological nature, which when exposed to those elements that will cure the adhesive, ie.. time exposure, temperature exposure, humidity exposure etc. to a semi-solid or rubbery substance which will adhere firmly to each of the two adherends, thus providing a continuous structure from one adherend to the other, will under the technique of the instant invention be introduced between the two adherends.

It is also imperative during the installation of the second adherend that force be applied thereto to move it into proper position and maintain it in this position until the adhesive is fully cured. It is also imperative that mechanical means be used to properly align and retain the second adherened in proper relation with the first adherend during the curing of the adhesive.

It is, therefore, an important object of this invention to provide an apparatus for installing a head end insulation in a rocket motor case while applying sufficient force and proper alignment to the insulation and case while an adhesive interposed between the two is properly cured to effect an efficient bond between the insulation and the head end of the case.

Another object of the invention is to provide mechanical means for introducing the adhesive into the rocket motor case between the insulation and the case.

A further object of the invention is to provide mechanical means that will assure conformity of the insulation with the interior surface of the head end of the rocket motor case.

It is still a further object of the invention to provide a controllable mechanical force means that will maintain the proper distance between the insulation and the head end of the rocket motor case during the installation and curing of the adhesive interposed between the insulation and the head end of the case.

With the above and other objects and advantages in view, it is believed that others will become apparent from a consideration of the following detailed description when considered in conjunction with the accompanying drawings, in which.

Figures 1, 2:
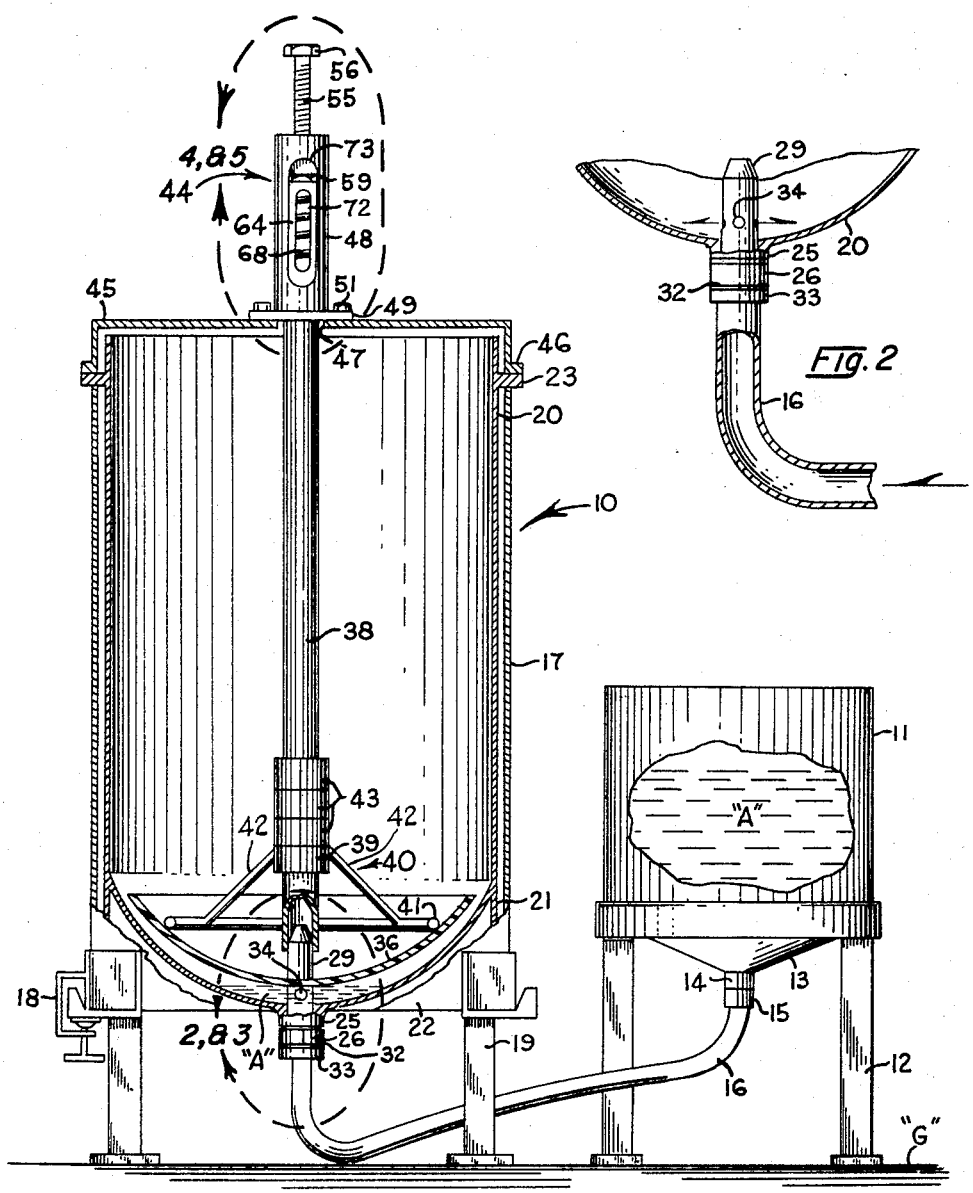
FIGURE 1 is a view, partly in elevation, partly in section and partly broken away, showing the apparatus embodying the invention in operation.
FIGURE 2 is a sectional schematic view of the injection nozzle within the area designated by the dotted line 2 and 3 of FIGURE 1.

FIGURE 4 is an enlarged sectional view, partly broken away, of that area designated by the dotted line 4 and 5 of FIGURE 1; and FIGURE 5 is an enlarged elevational view, partly broken away, of that area designated by the dotted line 4 and 5 of FIGURE 1.

Referring more in detail to the drawings, wherein like parts are designated by like reference numerals, the reference numeral 10 is used to generally designate the apparatus embodying the invention.

The apparatus 10 includes a reservoir 11 for an adhesive A and the reservoir 11 is provided with support standards 12 to elevate it above the ground level G. The standards 12 may be of any desired number having a fixed height or they may be adjustable to various heights as the situation warrants. The reservoir 11 has a frusto-conical shaped bottom which is provided at the apex thereof with an outlet coupling 14 to which is connected by a coupling 15 a flexible or semi-flexible conduit 16. The shape of the bottom 13 permits complete drainage therefrom of the adhesive A.

The apparatus 10 also includes a cylindrical support container 17 which is connected by C-clamps or other attaching means 18 to a support assembly 19 for the container 17 and raises it above the ground level G to which it may or may not be rigidly secured as required.

A rocket motor case 20 of conventional design is positioned within the container 17 and is supported therein by means of a circular skirt 21 which is part of the case 20 at the head end thereof. The peripheral edge of the skirt 21 resting on the bottom 22 of the container 17 retains the case 20 in spaced vertical relation to the wall of the container 17, as shown in FIGURE 1, and an annular flange 23, integral with the case 20 and adjacent the aft end thereof, engages the upper peripheral edge of the container 17 and assists in stabilizing the case 20 in the container 17.

Figure 3:
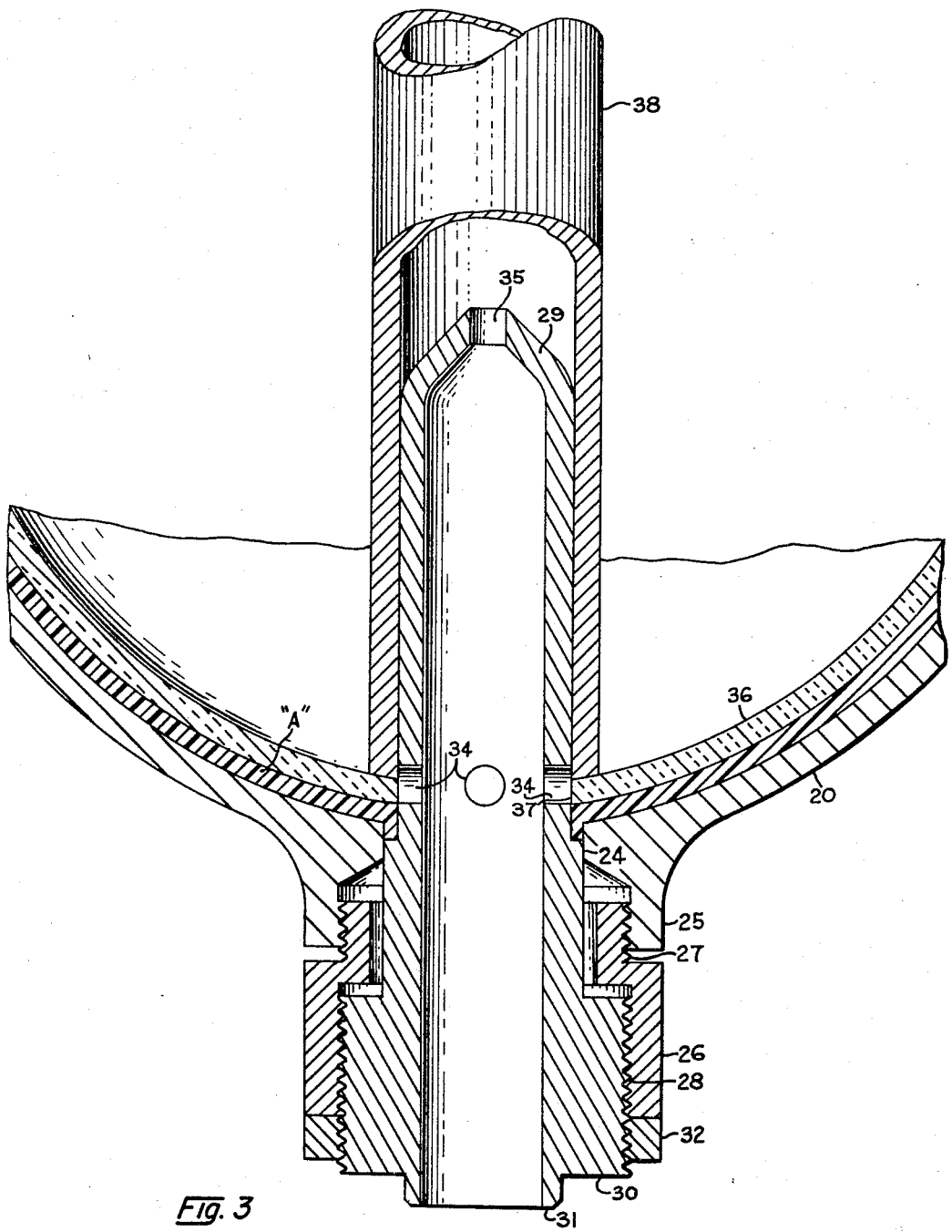
FIGURE 3 is an enlarged fragmentary sectional view of that area designated by the dotted line 2 and 3 of of FIGURE 1.

As shown in FIGURE 3, the case 20, in the conventional manner, is provided in the domed head section thereof with an opening 24 and concentric with the opening 24 is an integral internally threaded flange 25. It has been previously stated that the opening 24, in the domed section of the case 20, is concentric about the longitudinal center line of the case 20 and that the opening 24 is important in carrying out the instant invention.

An adapter 26 is adjustably connected to the flange 25 by means of a reduced externally threaded portion 27 and the adapter 26 is also provided with an internally threaded socket portion 28.

A tubular alignment stud and nozzle 29 is then inserted into the adapter 26 and is connected to the adapter 26 by means of an enlarged externally threaded base portion 30. The stud 29 is rotated within the adapter 26 by means of a wrench engaging boss 31 which is concentric with the interior of the stud 29 and is integral with the bottom surface of the base 30. After the stud 29 has been rotated so that it assumes its proper position within the case 20, a lock nut 32 is then threaded onto the base 30 and engaging the outer peripheral edge of the coupling 26 firmly retains the stud 29 in fixed relation to the coupling 26. As shown in FIGURE 1, the conduit 16 is then connected to the base 30 of the stud 29 by means of a connector 33.

At this time the adhesive A in the reservoir 11 can be fed by any well-known means, i.e. air pressure in the reservoir 11 or by a hydraulically or mechanically operated piston, etc. through the conduit 16 into the stud 29. To carry out the invention, the stud 29 is provided with a row of radially disposed outlet ports 34 for the injection of the adhesive A into the case 20 and an air outlet port 35 in the innermost end of the stud 29 permits the escape of any air trapped in the conduit 16 or stud 29 when the adhesive A is or is not being fed through the ports 34 in the stud 29 or any overflow of excessive adhesive may also pass outwardly of the stud 29 through the port 35.

The adhesive A, which at this time is in semi-liquid form, is fed into the case 20 until a sufficient amount has been provided to carry out the precepts of the instant invention. Flow of the adhesive A is then stopped by pinching the conduit 16 or by otherwise stopping the flow and the adhesive A is allowed to settle until all air bubbles have risen to the surface and allowed to burst or are burst by sticking a sharp pointed tool into the bubbles.

A dish-shaped rigid or semi-rigid insulation 36 is then passed through the aft opening of the case 20 and lowered into the case 20 until a central opening therein engages the stud 29 and the insulation 36 finally comes to rest in contact with the adhesive A. It has already been stated that the insulation 36 conforms in shape with the domed head section of the case 20, also that the diameter of the opening 37 is slightly less than the opening 24 in the case 20 and is also concentric about the longitudinal center line of the case 20.

A hold down tube 38 is then lowered into the case 20 until it engages the stud 29, as shown in FIGURE 1.

Before the tube 38 is lowered into the case 20, a circular collar 39 is positioned thereon and while the collar 39 will slide freely on the tube 38, the tolerance therebetween is such that a snug fit is provided that is not sloppy, yet permits free sliding movement of the collar 39 on the tube 38.

Connected to the collar 39 is a spider 40 that comprises a circular ring 41 that engages the insulation 36 and a plurality of downwardly and outwardly inclined support legs 42 that are rigid at their opposite ends with the collar 39 and ring 41. The spider 40 serves to prevent the insulation 36 from buckling or warping as the insulation is pushed downwardly by the tube 38 and depending upon the force that is required to retain the insulation 36 in proper shape, hold down weights 43 may be selectively positioned on the tube 38 and lowered until they engage and rest on the collar 39 to retain the circular ring 41 in firm contact with the insulation 36.

A force applying assembly 44 is then positioned over the aft end of the case 20 and container 11 and comprises a cap-shaped mounting bracket 45 that has a flange 46 on the peripheral edge thereof that engages and rests on the flange 23 on the case 20, and C-clamps or other similar clamping means may be used to secure the assembly 44 in rigid relation to the case 20. The bracket 45 has a centrally located opening 47 therein which permits the upper end of the tube 38 to extend therethrough. The assembly 44 comprises also a tubular housing 48 which at its lower peripheral edge is provided with an annular flange 49. The flange 49 is provided with a plurality of spaced threaded openings 50 through which bolts 51 will extend to rigidly connect the housing 48 to the bracket 45 so that the opening 47 in the bracket 45 is properly aligned with the interior of the housing 48.

The upper end of the housing 48 is closed by a stopper 52 that is retained in place by a plurality of pins 53 that extend through the housing 48 into the stopper 52, as shown in FIGURE 4. The stopper 52 is provided with a threaded opening 54 through which extends a threaded portion 55 of a bolt 56. A plunger 57 is mounted on the portion 55 of the bolt 56 by a threaded central opening 58 and lock nuts 59 and 60 on the threaded portion 55 of the bolt 56 retains the plunger 57 in fixed relation to the bolt 56. The bolt 56 has a smooth intermediate portion 61 that extends through a central opening 62 in a reduced base portion 63 of a cylinder 64 and the extreme outer end of the bolt 56 is again threaded, as at 65, so that lock nuts 66 and 67 positioned thereon engage and retain the cylinder 64 in fixed relation to the bolt 56.

A coiled expansion spring 68 is mounted on the bolt 56 in circumjacent relation to the smooth portion 61 thereon, and one end of the spring 68 engages and rests on the inner surface of the base portion 63 of the cylinder 64 while the opposite end engages a circular indicating plate or disc 69, that is loosely mounted on the smooth portion 61 of the bolt 56. The plate 69 is adapted to coact with a calibrated force scale 70 that is secured to the outer surface of the cylinder 64 by screws 71. A longitudinally extending elongated slot 72 in the cylinder 64 permits the exposure of the plate 69 so that both the plate 69 and scale 70 can be viewed by an operator through a plurality of elongated windows 73 that extend longitudinally of the housing 48 and are radially disposed therein.

The reduced base portion 63 of the cylinder 64 is of a diameter to fit snugly within the upper end of the tube 38 and the cylinder 64 provides an annular shoulder 74 that is in circumjacent relation to the base portion 63 and engages the upper peripheral edge of the tube 38.

When the bolt 56 is rotated by any well-known means, such as a wrench etc., the plunger 57 will compress the spring 68 and urge the plate 69 downwardly within the cylinder 64. This action which also forces the cylinder 64 downwardly, will by means of the engagement of the shoulder 74 of the base portion 63 with the peripheral edge of the tube 38, move the tube downwardly within the case 20. Downward movement of the tube 38 will cause the spider 40 to move the insulation downwardly to compress the adhesive A between the insulation 36 and the domed section of the case 20. The plate 69, by its coacting with the scale 70, will indicate the amount of force that is being applied to the tube 38.

As the force is applied to the tube 38, the insulation 36 will compress the adhesive A and cause the adhesive A to flow over the surface of the insulation 36 and the domed section of the case 20. Any excess adhesive will flow over the upper peripheral edge of the insulation 36, to be later removed after the adhesive A has been cured, Some type of a protective layer may be placed on the upper surface of the insulation 36 to prevent the adhesive A from adhering to the insulation 36. If the coupling 33 is also disconnected from the base portion 30 of the stud 29, excess adhesive on the insulation 36 may drain outwardly through the ports 34 of the stud 29.

In carrying out the instant invention, as shown in FIGURE 1, the case 20 is positioned in the container 17 so that the head end of the case 20 is lowermost with the longitudinal center line of the case 20, plumb, and supported so that access to the opening 24 in the case 20 and the open aft end therein are readily available.

The conduit 16 is coupled to the base 30 of the stud 29 by the connector 33 and the uncured adhesive A is forced from the reservoir 11 into the domed head section of the case 20. The adhesive A being at this time in a fluid or semi-fluid state, will readily enter the domed section of the case 20 and it is imperative that during the flow of the adhesive A, no air be permitted to contact the adhesive A to cause air bubbles to form therein. As previously stated, the adhesive A is allowed to settle at this time, so that any air bubbles trapped therein may be liberated or burst by puncturing the bubble with a sharp tool or by a vacuum probe etc.

The insulation 36 is then lowered into the case 20 until it contacts the adhesive A, and force is then applied, as previously described, by the force applying assembly 44 to move the insulation 36 downward against the adhesive A until it is spaced the proper distance from the inner surface of the domed section of the case 20, with the adhesive A interposed therebetween.

Flow of the adhesive A is then stopped, the connector 33 is removed from the base portion 30 of the stud 29 and all of the adhesive A that will drain from the case 20 has been removed therefrom. The adhesive A remaining entrapped between the insulation 36 and the surface of the case 20 is then cured by removing the case 20 from the container 17 and subjecting the case 20 to the conditions that are required to properly cure the adhesive A. After the adhesive A has been cured, the bracket 45 and the assembly associated therewith is removed from the case 20, then the tube 38 and the parts associated therewith are removed from the case 20. All excessive adhesive A is then removed and the case 20 is then ready to receive further treatment to complete a rocket motor.

It is believed that there are more variations that may be suggested in carrying out the instant invention and it is believed that such variations are protected, provided they fall within the spirit of the invention and the scope of the appended claims.

It is also believed that the foregoing description, when taken in conjunction with the accompanying drawings, will fully explain the invention to those skilled in the art.

Having thus described the invention what is claimed as new and desired to be secured by Letters Patent is:

1. The combination of a rocket motor case having a domed head end section having a centralized opening therein and an apparatus for installing insulation in the domed head end section comprising means for supporting the rocket motor case in a vertical position so that the longitudinal center line thereof is plumb, a reservoir, a conduit connecting said reservoir to the opening in the domed head end section for feeding an adhesive into the domed head end section, an aligning stud positioned in the opening in the domed head end section and said conduit is connected to said aligning stud, means for forcing the insulation into contact with the adhesive and means for aligning said last said means to retain the insulation in conforming relation with the domed head end section.

2. The combination of a rocket motor case having a domed head end section having a centralized opening therein and an apparatus for installing insulation in the domed head end section comprising means for supporting the rocket motor case in a vertical position so that the longitudinal center line thereof is plumb, means for feeding an adhesive into the domed head end section, a longitudinally extending tubular member, a spider formation slidably mounted on said tubular member, and said spider formation comprises a ring member that is in direct contact with the insulation, for forcing the insulation into contact with the adhesive and means for aligning said tubular member to retain the insulation in conforming relation with the domed head end section.

3. The combination of a rocket motor case having a domed head end section having a centralized opening therein and an apparatus for installing insulation in the domed head end section comprising means for supporting the rocket motor case in a vertical position so that the longitudinal center line thereof is plumb, means for feeding an adhesive into the domed head end section, a longitudinally extending tubular member, a spider formation slidably mounted on said tubular member and said spider formation comprises a ring member that is in direct contact with the insulation, for forcing the insulation into contact with the adhesive, circular weights selectively mounted on said tubular member to engage said spider to retain said ring member thereon in contact with the insulation, and means for aligning said last said means to retain the insulation in conforming relation with the domed head end section.

4. The combination of a rocket motor case having a domed head end section having a centralized opening therein and an apparatus for installing insulation in the domed head end section comprising means for supporting the rocket motor case in a vertical position so that the longitudinal center line thereof is plumb, means for feeding an adhesive into the domed head end section, a longitudinally extending tubular member, a spider formation slidably mounted on said tubular member and said spider formation comprises a ring member that is in direct contact with the insulation, for forcing the insulation into contact with the adhesive, circular weights selectively mounted on said tubular member to engage said spider to retain said ring member thereon in contact with the insulation, means for aligning said last said means to retain the insulation in conforming relation with the domed head end section, and a force applying assembly mounted on said supporting means and engaging the upper end of said tubular member to force said tubular member and the spider thereon downward against the insulation.

5. The combination of a rocket motor case having a domed head end section having a centralized opening therein and an apparatus for installing insulation in the domed head end section comprising means for supporting the rocket motor case in a vertical position so that the longitudinal center line thereof is plumb, a reservoir, a conduit connecting said reservoir to the opening in the domed head end section for feeding an adhesive into the domed head end section, an aligning stud positioned in the opening in the domed head end section and said conduit is connected to said aligning stud, means for forcing the insulation into contact with the adhesive and a tubular member positioned over said aligning stud for aligning said last said means to retain the insulation in conforming relation with the domed head end section.

6. The combination of a rocket motor case having a domed head end section having a centralized opening therein and an apparatus for installing insulation in the domed head end section comprising means for supporting the rocket motor case in a vertical position so that the longitudinal center line thereof is plumb, means for feeding an adhesive into the domed head end section, a longitudinally extending tubular member, a spider formation slidably mounted on said tubular member and said spider formation comprises a ring member that is in direct contact with the insulation, for forcing the insulation into contact with the adhesive, circular weights selectively mounted on said tubular member to engage said spider to retain said ring member thereon in contact with the insulation, means for aligning said last said means to retain the insulation in conforming relation with the domed head end section, a force applying assembly mounted on said supporting means and engaging the upper end of said tubular member to force said tubular member and the spider thereon downward against the insulation, and said force applying assembly comprises a force indicating means to indicate the amount of force that is being exerted to force the insulation downwardly into contact with the adhesive and for the compression thereof.

References Cited

UNITED STATES PATENTS

| | | | |
|---|---|---|---|
| 2,495,640 | 1/1950 | Muskat | 156—278 XR |
| 2,613,397 | 10/1952 | Borkland | 156—228 XR |
| 2,994,359 | 8/1961 | Westbrook et al. | 156—423 XR |

EARL M. BERGERT, *Primary Examiner.*

D. J. FRITSCH, *Assistant Examiner.*